United States Patent [19]
Adam

[11] 3,753,315
[45] Aug. 21, 1973

[54] DEVICE FOR IRRIGATION ESPECIALLY OF FLOWER POTS
[76] Inventor: Roger Francois Jean Adam, 40, rue du Mont Valerien, Saint Cloud, France
[22] Filed: May 27, 1971
[21] Appl. No.: 147,383

[30] Foreign Application Priority Data
May 28, 1970  France .............................. 7019572

[52] U.S. Cl. .................................... 47/38, 47/38.1
[51] Int. Cl. ................................................ A01g 27/00
[58] Field of Search .................... 47/38, 38.1, 38.10

[56] References Cited
UNITED STATES PATENTS

| | | | |
|---|---|---|---|
| 1,221,449 | 4/1917 | Hitchcock | 47/38.1 |
| 1,940,044 | 12/1933 | Brandt | 47/38.1 |
| 3,534,498 | 10/1970 | Herrli | 47/38.1 |
| 3,049,834 | 8/1962 | Heath | 47/38.1 |
| 3,125,255 | 3/1964 | Kaiser | 47/38 X |
| 3,067,543 | 12/1962 | Bracey | 47/38.1 |
| 2,249,197 | 7/1941 | Brundin | 47/38 |
| 3,445,717 | 7/1948 | Richards | 47/38.1 |
| 3,193,970 | 7/1965 | Green | 47/38.1 |
| 2,491,124 | 12/1949 | Martin | 47/38.1 X |
| 1,231,976 | 7/1917 | Weitzel | 47/38.1 X |

FOREIGN PATENTS OR APPLICATIONS

| | | | |
|---|---|---|---|
| 14,554 | 6/1907 | Great Britain | 47/38.1 |
| 570,628 | 2/1933 | Germany | 47/38.10 |
| 1,200,604 | 9/1965 | Germany | 47/38.1 |
| 93,741 | 10/1959 | Netherlands | 47/38.1 |

Primary Examiner—Robert E. Pulfrey
Assistant Examiner—Eugene H. Eickholt
Attorney—Waters, Roditi, Schwartz & Nissen

[57] ABSTRACT

An irrigation device comprising a closed water tank having a hermetically closable filling stopper at its upper end and a water outlet at its lower end and a receptacle formed with two cavities therein and adapted for receiving a flower pot which is to be irrigated. A first cavity is connected to the water outlet of the tank to permit free flow of water from the tank into the first cavity and the second cavity is open to the atmosphere and is connected via an air conduit to the upper end of the tank above the level of the water therein. The second cavity can receive water by overflow from the first cavity to establish a height of water in the cavities to the level of the water inlet. The outlet of the air conduit is below the water outlet so that water flows from the water outlet only when the level of water has dropped below the outlet of the air conduit. A sponge or similar absorption medium is disposed in one of the cavities for supplying water to the flower pot. When the sponge is in the first cavity water will be supplied cyclically and the first cavity will be periodically filled an emptied by the pot. When the sponge is in the second cavity water will be supplied continuously to the pot. In a modification the pot is replaced by a bed of soil and the second cavity is isolated therefrom while the first cavity is connected to the bed of soil through the intermediary of a porous wall. The sponge is placed in the first cavity.

10 Claims, 5 Drawing Figures

PATENTED AUG 21 1973  3,753,315
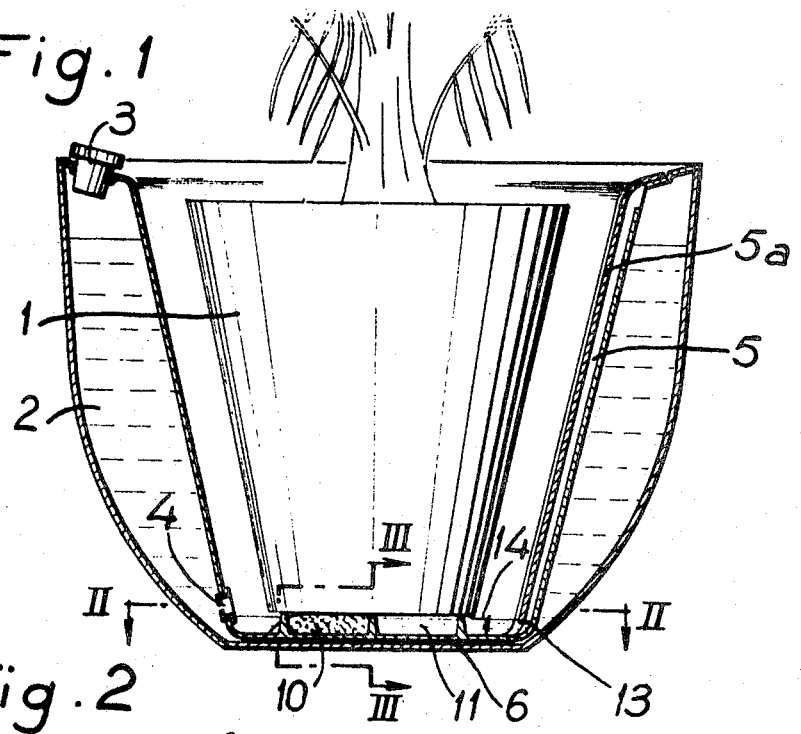
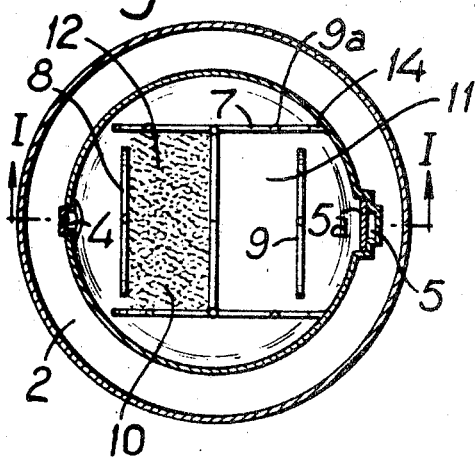
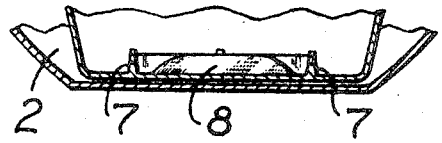
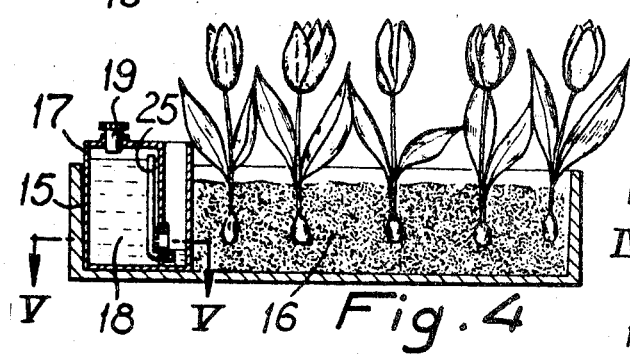
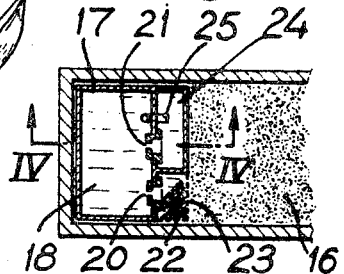

DEVICE FOR IRRIGATION ESPECIALLY OF FLOWER POTS

The present invention relates to improvements in such irrigation devices to enable the same to be used not only for continous irrigation but in cyclic irrigation as well. The device is also usable with plants which are not individually potted.

According to the present invention, a pot is disposed a given distance from the bottom of a receptacle which is supplied with water from the tank and porous material, for instance a sponge is placed between this bottom and the flower pot at a location either near a water outlet from the tank or at a remote location therefrom, this alternative providing a choice between a continuous irrigation of the plant according to its capability of absorbing water and a cyclic irrigation whose intensity depends on the amount of moisture in the air which regulates the evaporation of water in the bottom of the receptacle.

In a particular embodiment, the latter mode of irrigation is applied to flower stands by disposing at the foot of the water tank two outlets for the water, one feeding the flower stand, the other a compartment whose water level depends on the rate of evaporation and controls a flow of water which selectively blocks air entry at the end of a pipe connected with the top of the water tank.

The following description will be given with reference to the accompanying drawings, by way of example, to explain how these improvments may be carried into practice.

FIG. 1 is a vertical section taken on line I—I in FIG. 2 showing a flower pot cover with water tank allowing, at will, either continuous or cyclic irrigation.

FIG. 2 is a horizontal cross section taken on line II—II in FIG. 1.

FIG. 3 is a cross section taken along line III—III of FIG. 1.

FIG. 4 is a vertical cross section through a flower stand with a separate water tank, taken on line IV—IV in FIG. 5.

FIG. 5 is a horizontal cross-section taken on line V—V in FIG. 4.

Referring to FIG. 1, therein is seen a flower pot 1 supported in a receptacle constructed as an annular water tank 2 and appearing as a flower pot cover. The tank 2 includes a hermetical filling stopper 3 and an outlet orifice 4, and along its inner wall there is provided an air pipe 5 extending from the top of the tank down to a given level 13 above the bottom 6 of an irrigation chamber.

The flower pot 1 is supported above the bottom 6 by a given distance by means of props 9a which are higher than bars or ribs 7, 8, 9. The rib 7 is in the form of an H end the ribs 10 and 11 extend parallel to the central web of rib 7 to define the limits between two equal cavities 10 and 11 which are separated from one another by the central web of rib 7. A sponge 12 whose dimensions correspond to those of the cavities may be lodged at will in either cavity.

The irrigating system operates as follows:

The sponge 12 is lodged in the cavity 10 proximate the orifice 4, as shown on the drawing, the top of the sponge being higher than the props to touch the flower pot 1 which is composed of a porous substance; the water flowing out of the orifice 4 enters by passing the cavity 10 over the lateral edges of rib 8 (see FIG. 3). The water level rises in the cavity 10 and flows over central web of rib 7 into cavity 11. Water from orifice 4 also flows into the surrounding space within the inner wall of tank 2 via small passageways formed between the ends of the parallel legs of rib 7 and the interior wall as seen at the left end of the parallel legs of rib 7 in FIG. 2. The right ends of these parallel legs are integral with the inner wall. The legs are formed with orifices 14 at their upper edges to admit water into cavity 11 from the space within the inner wall bounded by the legs of rib 7. In this way, water fills the cavity 11 to cover the upper edge of the air entry 13 and thereafter stops the flow of water through the outlet 4.

Conducted by the sponge 12, water feeds the pot by capillary action until the cavity 10 and all the parts in communication therewith are dry. However the contained water in the cavity 11 is not sucked by the pot and the level of water therein can only fall by normal evaporation according to the moisture content of the atmosphere.

Sufficient evaporation has taken place, the drop of water level opens the orifice 13 a new cycle of irrigation begins. This cycle is especially effective for green plants.

Alternatively, if the sponge 12 is lodged in the opposite cavity, instead of a cyclic irrigation, the plant is provided with a permanent irrigation which is especially beneficial for flowering plants. In cavity 11, the sponge continuously tranfers water to the pot sucking it in the cavity each time the water level falls as a result of absorption by the plant.

The same apparatus is thereby able to supply different types of plants with water since it is possible to obtain a permanent bath at the roots of plants which demand constant moisture or a cyclic irrigation for plants which prefer this type of watering.

In the herein described embodiment the air inlet is formed by placing a plate 5a on a groove or recess formed in the inner wall of tank 2. The plate 5a can be transparent and preferably is adjustable to control the size of orifice 13. The lower edge of plate 5a may be rectilinear to control the air entry operation with precision. Nevertheless it is also possible to provide said edge with a triangular notch such that higher levels of the air entry 13 have a smaller width than the lower levels, thereby differentiating the time of beginning and the time of ending of water flow. With such a shape, the priming of the air flow is not possible before the level of the water reaches the foot of the notch, on the contrary the end of air flow can not be obtained before the higher part of the notch is completely covered. The lower edge of the plate 5a could also include a sliding part in order to adjust the height of the water in the bottom of the flower pot.

This described device is used as an irrigating ornamental flower pot (flower pot cover).

In the embodiment described in FIGS. 4 and 5, there is shown a device built as an independent water tank for supplying an ordinary flower stand.

For this purpose, in a portion of a flower stand, from which the earth 16 has been removed, a container 17 is placed, which includes a water tank 18 closed by an air-tight filling stopper 19. The tank is provided with two water outlets 20 and 21. One of the outlets 20 feeds water into a cavity 22 limited by a porous wall 23 which is in contact with the soil 16. The other outlet 21 feeds water into a cavity 24 bounded by impermeable walls. An inlet air pipe 25 extends from the top of container 17 into cavity 24 and has an orifice near the bottom of the cavity located at the level which must be reached by the water during each irrigating operation.

The uncovering of this air inlet in the cavity 24 depends on the natural evaporation of water in this cavity and not of the sucking by soil and plants.

The container above described is, of course, adaptable to all existing flower plants.

It is clear that, without going beyond the limits of this invention as defined in the appended claims, it is possible to modify the above described embodiments. Thus in the case of the embodiment described with reference to FIGS. 4 and 5, it would be possible to obtain a choice between two modes of irrigation by transferring the air inlet pipe, to the cavity 22 or by using two pipes one being fitted with a stopper. The use of one or both modes of irrigation would also be possible for flower pots disposed in flower stands with a filling of the same by sand — transmitting only water — by disposing the pots in the sand to the desired depth. The details of said embodiments could be also adapted from one to the other and, for example, the venting orifice of FIGS. 1 to 3 could be protected by a porous walling.

What I claim is:

1. A device which is arranged as a container adaptable to a flower stand, said container including a suction feeding water tank having an airtight filling stopper and two water outlets, one of said outlets being situated in a cavity hermetically separated from soil in said stand, said cavity being open to the atmosphere, the other outlet being in another cavity separated from said soil by a porous walling, at least one separate air inlet existing in one of said cavities at a level below the water outlet in said cavity.

2. An irrigation device comprising a closed, hollow receptacle for water defining a recess adapted for receiving a flower pot, said receptacle having a hermetically closable filling stopper at the upper end thereof and a water outlet at the lower end for supply of water to the flower pot, an air conduit having an inlet which opens into the top of the receptacle above the water level therein and an outlet which opens into said recess, means in said space defining two cavities therein, a first cavity being in communication with said water outlet for freely receiving water therefrom, the second cavity being open to the atmosphere and in communication with said outlet of the air conduit, means providing communication between said cavities to permit water flow into said first cavity when the level of water in said second cavity falls below the outlet of the air conduit, and absorption means in one of said cavities for supplying water to said pot.

3. A device as claimed in claim 2 wherein said cavities are the same size, said absorption means being of the same size at said cavities and selectively placeable in one or the other.

4. A device as claimed in claim 2 wherein said hollow receptacle includes an inner wall defining said recess, said wall being provided with a groove with a hermetic plate covering the same and forming said air conduit, said plate having a lower edge which is located above the lower end of said groove and which defines the upper edge of said outlet of said air conduit.

5. A device as claimed in claim 4 wherein said lower edge of said plate is horizontal and linear, said plate being adjustable along the length of the groove.

6. An irrigation device comprising a closed water tank having a hermetically closable filling stopper at the upper end thereof and a water outlet at the lower end thereof, a receptacle for receiving a flower pot, said receptacle defining two cavities therein, means connecting a first of said cavities with said water outlet from the tank to allow free flow of water from the tank to the first cavity, the second of the cavities being open to the atmosphere, an air conduit having an outlet connected to the second cavity and an inlet connected to the tank at the upper end thereof above the water level in the tank, means providing communication between said cavities to permit overflow from the first cavity to the second to establish a height of water in said cavities to the level of the water inlet, said outlet of the air conduit being below the water outlet to enable flow of water from said water outlet into said first cavity only when the level of water has dropped below the outlet of said air conduit, and absorption means disposed in one of said cavities for supplying water to the flower pot.

7. A device as claimed in claim 6 wherein said cavities are the same size, said absorption means being of the same size at said cavities and selectively placeable in one or the other.

8. A device as claimed in claim 6 wherein said tank includes an inner wall having a groove, and a hermetic plate covering the groove and together therewith forming said air conduit, said plate having a lower edge which is located above the lower end of said groove and which defines the upper edge of said outlet of said air conduit.

9. A device as claimed in claim 8 wherein said lower edge of said plate is horizontal and linear, said plate being adjustable along the length of the groove.

10. A device as claimed in claim 6 wherein said tank is constituted as an annular member to surround the flower pot and serve as a cover therefor.

* * * * *